Patented Oct. 17, 1939

2,176,063

UNITED STATES PATENT OFFICE

2,176,063

DERIVATIVES OF PYRAZINE CARBOXYLIC ACID AND PROCESSES FOR THEIR PRODUCTION

Otto Dalmer and Claus Diehl, Darmstadt, and Eugen Walter, Munich, Germany, assignors to Merck & Co., Inc., Rahway, N. J., a corporation of New Jersey No Drawing. Application August 25, 1937, Serial No. 160,830. In Germany September 1, 1936

8 Claims. (Cl. 260—250)

This invention relates to derivatives of pyrazine-mono-carboxylic acid, and to processes for their production.

Previously, pyrazine-mono-carboxylic acid hydrazides of the formula

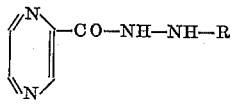

where R is a hydrogen atom or an alkyl radical, have been produced, and have been found to be effective analeptics, since they exhibit a marked stimulating effect upon the cardiac, circulatory, and respiratory systems.

We have now found that certain related compounds, namely, derivatives of pyrazine-mono-carboxylic acid hydrazides of the formula

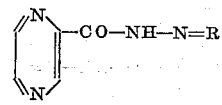

where R is an alkylidene or arylidene or substituted alkylidene or arylidene radical double-bonded to the end nitrogen atom, are also serviceable for use as analeptics.

These new compounds not only exhibit physiological properties comparable with the known compounds in which the alkyl radical is joined by a single bond to the end nitrogen of the hydrazide, but they also possess certain physical characteristics which render them more desirable for therapeutic use. They are more easily crystallized and purified, exhibit greater resistance to the action of atmospheric oxygen and are more stable in other respects, as for instance in aqueous solution, which renders them suitable for injection. Furthermore, certain of the new compounds, as for example the isopropylidene hydrazide, are also preferable from a pharmacological point of view, because they are less toxic than the known compounds, when administered in doses of equal potency.

From a chemical point of view, it is surprising that certain of the new substituted derivatives, as for instance, the isopropylidene derivatives, exhibit a greater degree of water solubility than the unsubstituted hydrazides, because, in general, the degree of water solubility is less when hydrogen atoms are substituted by hydrocarbon radicals.

The new compounds are prepared by the condensation of the pyrazine-carboxylic-acid-hydrazide with the appropriate aldehydes and ketones or substituted aldehydes and ketones, as will further appear in the examples, to obtain products of the general formula Py-CO-NH-N=R. The two hydrogen atoms of the NH$_2$ group are so reactive with carbonyl oxygen, that condensation of the acid with some of the aldehydes and ketones proceeds smoothly with formation of water. Often, a brief heating of the two reactants in a suitable solvent is sufficient. For the objectives of the present invention, aliphatic, aromatic, and hydro-aromatic aldehydes and ketones and their substituted derivatives, as well as dicarbonyl compounds, among which may be mentioned acetaldehyde, acetone, methyl-ethyl ketone, methyl-heptenone, trichloracetaldehyde, diacetyl, phenyl-methyl diketone, benzaldehyde, salicyl aldehyde, etc., may be employed.

The following examples of the process and products present typical and appropriate methods of practicing the invention and are given by way of illustration and not of limitation, and it is understood that we do not wish to be limited to the specific embodiments shown therein as the order of steps of the process and the various materials employed may be modified within obvious limits without departing from the invention substantially as described and claimed.

Examples

1. About 70 parts of pyrazine-mono-carboxylic acid hydrazide in 1200 parts of absolute alcohol are mixed with about 30 parts of acetaldehyde and refluxed for about ¼ hour. Most of the alcohol is then distilled off and the residue crystallizes out in glossy scales. It is purified by re-crystallization from methanol ether. The pyrazine-mono-carboxylic acid ethylidene hydrazide thus obtained forms solid glossy scales having a melting point of about 170–171°. It is readily soluble in ethanol and methanol, and less soluble in acetone and acetic ester. It is also soluble in water, but only slightly soluble in ether.

2. Pyrazine-mono-carboxylic acid hydrazide is boiled in about seven times its weight of pure acetone, until it is completely dissolved. After about three-fourths of the acetone is distilled off, the residue crystallizes out and pyrazine-mono-carboxylic acid iso-propylidene hydrazide separates out in the form of solid spears or leaflets; it may also occur in the form of thick, translucent crystals.

The crude material is washed with acetone and then with ether, and is recrystallized from acetone in the presence of animal charcoal.

The substance occurs in the form of snowwhite glossy leaflets or irregular transparent crystals, having a melting point of 143–145°. It is readily soluble in hot ethanol, methanol, acetone, or acetic ester and less readily soluble in the cold solvents. In ether it is taken up slightly. It is soluble in cold water up to about 12%.

3. Pyrazine-mono-carboxylic acid hydrazide is heated in methyl-ethyl ketone instead of acetone until it is dissolved. The solution solidifies while cooling, and pyrazine-mono-carboxylic acid-iso-butylidene hydrazide separates out in the form of longitudinal hexagonal spears or plates melting at about 131–132°, and being readily soluble in alcohols, acetone and water; it is somewhat less soluble in acetic ester, and only slightly soluble in ether.

4. Pyrazine-mono-carboxylic acid hydrazide is refluxed for about 1½ hours in methanol solution with a small excess of methylheptenone, after which the solvent is drawn off. The residue crystallizes to pyrazine-mono-carboxylic acid iso-octenylidene hydrazide which is purified by recrystallization from ether. The substance is thus obtained in practically quantitative yield in the form of a slightly yellowish, fine crystalline powder, melting at 70–71°. It is slightly soluble in water, and more readily soluble in most organic solvents, except petroleum ether.

5. About 1 mol of pyrazine-mono-carboxylic acid hydrazide is quickly stirred with about 2 mols of trichloracetaldehyde whereupon, under heating, solution is first effected, and then crystalline solidification. The product is washed with water, filtered off by suction, and washed out. It is then dissolved in acetic acid, dried over calcium chloride, and decolorized with carbon. Pyrazine mono-carboxylic acid-trichlorethylidene hydrazide is separated from the concentrated solution in the form of needles melting at about 180–181°. The residue is precipitated by the addition of petroleum ether. The substance is freely soluble in hot alcohols and acetic ester; it is also soluble in cold acetone, and slightly soluble in cod ether.

6. Pyrazine-mono-carboxylic acid hydrazide in methanol is refluxed for about 1 hour with ⅓ its weight of diacetyl. Dipyrazine-mono-carboxylic acid butylidene hydrazide having a melting point of about 223–225° is obtained. It is slightly soluble in methanol, and in water and the usual inert organic solvents.

7. About 30 parts of phenylmethyl-diketone in 100 parts of methanol are added to about 28 parts of finely pulverized pyrazine-mono-carboxylic acid hydrazide; solution is effected, followed by solidification. Brief heating on the steambath completes the reaction. The material is cooled, filtered by suction, and washed with ether. Recrystallization from acetone yields pyrazine-mono-carboxylic-acid-α-benzoyl-ethylidene-hydrazide in the form of small, practically white, glossy needles having a melting point of 145–146°. It is slightly soluble in water and ether and readily soluble in hot alcohols, acetone, acetic ester and benzene.

8. Molecular quantities of pyrazine-mono-carboxylic acid hydrazide and benzaldehyde are mixed in absolute alcohol. Under separation of a white mass, reaction is effected, and is completed by a brief heating on the steambath. After cooling, the substance is filtered off by suction and washed with ether. The thus obtained pyrazine-mono-carboxylic-acid-benzylidene hydrazide occurs in the form of a white crystalline powder having a melting point of about 236–237°, and being slightly soluble in water and organic solvents.

9. Molecular quantities of pyrazine-mono-carboxylic acid hydrazide and salicylaldehyde are treated in accordance with the process described in Example 8. Pyrazine-mono-carboxylic acid-2-hydroxybenzylidene hydrazide is obtained. It occurs in the form of slightly yellow, glossy crystals having a melting point of 207–208° and being slightly soluble in cold alcohols, cold acetone, chloroform and water, and more readily soluble in hot alcohols.

We claim as our invention:

1. A product of the formula

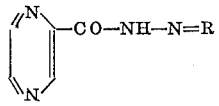

where R is an alkylidene radical.

2. Pyrazine-mono-carboxylic acid ethylidene hydrazide.

3. Pyrazine-mono-carboxylic acid iso-propylidene hydrazide.

4. Pyrazine-mono-carboxylic acid iso-butylidene hydrazide.

5. A process for the preparation of products of the formula

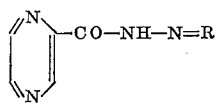

where R is an alkylidene radical, which comprises condensing pyrazine-mono-carboxylic acid hydrazide with a compound selected from the group consisting of aldehydes and ketones.

6. A process for the production of pyrazine-mono-carboxylic acid-ethylidene hydrazide which comprises condensing pyrazine-mono-carboxylic acid hydrazide with acetaldehyde.

7. A process for the production of pyrazine-mono-carboxylic acid-isopropylidene hydrazide which comprises condensing pyrazine-mono-carboxylic acid hydrazide with acetone.

8. A process for the production of pyrazine-mono-carboxylic acid-iso-butylidene hydrazide which comprises condensing pyrazine-mono-carboxylic acid hydrazide with methyl-ethyl ketone.

OTTO DALMER.
CLAUS DIEHL.
EUGEN WALTER.